United States Patent
Zhang et al.

(10) Patent No.: US 9,722,822 B1
(45) Date of Patent: Aug. 1, 2017

(54) METHOD AND SYSTEM USING DRIVER EQUALIZATION IN TRANSMISSION LINE CHANNELS WITH POWER OR GROUND TERMINATIONS

(71) Applicant: INPHI CORPORATION, Santa Clara, CA (US)

(72) Inventors: Liang Leon Zhang, Fremont, CA (US); Friedel Gerfers, Sunnyvale, CA (US); Carl Pobanz, Westlake Village, CA (US); Myoung Joon Choi, Santa Clara, CA (US); Vivek Gurumoorthy, San Jose, CA (US); Chienhsin Lee, Pleasanton, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/061,957

(22) Filed: Mar. 4, 2016

(51) Int. Cl.
*H04K 1/02* (2006.01)
*H04L 25/03* (2006.01)
*H04L 25/49* (2006.01)

(52) U.S. Cl.
CPC .............................. *H04L 25/03878* (2013.01)

(58) Field of Classification Search
CPC ................. H03F 1/3247; H03F 1/3294; H03F 2201/3233; H04L 27/368; H04L 25/03343
USPC .................................................. 375/295–297
See application file for complete search history.

(56) References Cited

U.S. PATENT DOCUMENTS

| | | | | |
|---|---|---|---|---|
| 3,578,914 A | * | 5/1971 | Simonelli | H04L 25/03885 333/18 |
| 4,280,221 A | * | 7/1981 | Chun | G08C 19/16 375/257 |
| 4,539,680 A | * | 9/1985 | Boudon | H04L 25/45 370/509 |
| 6,317,465 B1 | * | 11/2001 | Akamatsu | H04L 25/0272 375/257 |
| 6,373,908 B2 | * | 4/2002 | Chan | H04B 1/586 375/219 |
| 6,836,185 B1 | * | 12/2004 | Pobanz | G02F 1/0327 330/260 |
| 7,557,790 B2 | * | 7/2009 | Jeon | G09G 3/3611 345/100 |
| 7,671,632 B2 | * | 3/2010 | Kim | H04L 25/0272 326/59 |

(Continued)

*Primary Examiner* — James M Perez
(74) *Attorney, Agent, or Firm* — Richard T. Ogawa; Ogawa P.C.

(57) ABSTRACT

A driver circuit device using driver equalization in power and ground terminated transmission line channels. The driver circuit device can include a weaker pull-up driver, which is needed to pre-emphasize the pull-up signal for driver equalization in power terminated transmission line channels. The driver circuit device can also include a weaker pull-down driver, which is needed to pre-emphasize the pull-down signal for driver equalization in ground terminated transmission line channels. In the transmission line channels with power terminations, a weaker pull-up Ron is implemented. In the transmission line channels with ground terminations, a weaker pull-down Ron is implemented. Drivers implemented in power and/or ground terminated transmission line channels can be used to improve device performance, such as in signal eye opening.

14 Claims, 9 Drawing Sheets

(56) References Cited

U.S. PATENT DOCUMENTS

| | | | | |
|---|---|---|---|---|
| 7,672,447 B1* | 3/2010 | Lindqvist | H04B 3/23 | 379/406.08 |
| 7,697,628 B2* | 4/2010 | Choi | H04L 25/085 | 341/55 |
| 7,746,935 B2* | 6/2010 | Bonfiglio | H03F 3/217 | 327/111 |
| 7,826,549 B1* | 11/2010 | Aggarwal | H03C 1/60 | 332/170 |
| 7,983,347 B2* | 7/2011 | Hamada | H04L 25/0272 | 375/244 |
| 7,986,745 B2* | 7/2011 | Hosaka | H03M 5/16 | 341/58 |
| 8,064,535 B2* | 11/2011 | Wiley | H04L 5/20 | 341/58 |
| 8,259,838 B2* | 9/2012 | Tanimoto | H04L 25/0272 | 375/279 |
| 8,284,848 B2* | 10/2012 | Nam | H04B 3/00 | 375/244 |
| 8,472,532 B2* | 6/2013 | Schley-May | H04B 3/02 | 375/257 |
| 8,638,838 B1* | 1/2014 | Betts | H04L 5/16 | 326/30 |
| 8,717,213 B1* | 5/2014 | Wong | H04B 1/40 | 341/144 |
| 8,837,652 B2* | 9/2014 | Stern | H04L 5/0039 | 375/133 |
| 8,942,309 B1* | 1/2015 | Ware | H04L 25/14 | 365/189.07 |
| 8,942,658 B2* | 1/2015 | Banwell | H04B 1/58 | 343/852 |
| 8,948,608 B1* | 2/2015 | Pobanz | H04B 10/25 | 398/183 |
| 9,008,168 B2* | 4/2015 | Miller | H04N 5/268 | 375/232 |
| 9,300,461 B2* | 3/2016 | Akita | H03L 7/087 | |
| 9,385,790 B1* | 7/2016 | Mukherjee | H04B 5/0087 | |
| 9,419,779 B2* | 8/2016 | Pan | H04L 5/1415 | |
| 9,444,515 B2* | 9/2016 | Khan | H04B 1/7073 | |
| 2004/0096005 A1* | 5/2004 | Zabroda | H04L 12/413 | 375/257 |
| 2004/0179624 A1* | 9/2004 | Deas | H04L 25/028 | 375/259 |
| 2004/0239374 A1* | 12/2004 | Hori | H03K 5/003 | 327/65 |
| 2005/0147136 A1* | 7/2005 | Pobanz | G02F 1/0121 | 372/26 |
| 2005/0179473 A1* | 8/2005 | Nagahori | H04L 5/1423 | 327/110 |
| 2005/0198687 A1* | 9/2005 | Miller | H04N 7/108 | 725/127 |
| 2006/0018388 A1* | 1/2006 | Chan | H04B 3/23 | 375/257 |
| 2006/0227896 A1* | 10/2006 | Kiamilev | H04L 25/0274 | 375/297 |
| 2007/0164883 A1* | 7/2007 | Furtner | G06F 13/4295 | 341/126 |
| 2009/0028355 A1* | 1/2009 | Ishiguro | H04B 3/234 | 381/66 |
| 2010/0111202 A1* | 5/2010 | Schley-May | H04B 3/02 | 375/258 |
| 2011/0222623 A1* | 9/2011 | Hollis | H04L 25/0278 | 375/295 |
| 2012/0307122 A1* | 12/2012 | Liu | G05F 1/56 | 348/332 |
| 2013/0101056 A1* | 4/2013 | Ahn | H03F 3/45183 | 375/257 |
| 2013/0294294 A1* | 11/2013 | Pan | H04B 1/586 | 370/276 |
| 2014/0064404 A1* | 3/2014 | Gonzalez | H04L 25/0288 | 375/296 |
| 2014/0126665 A1* | 5/2014 | Lee | H04B 1/1607 | 375/295 |
| 2014/0219382 A1* | 8/2014 | Wu | H04L 25/0266 | 375/295 |
| 2015/0207526 A1* | 7/2015 | Shi | H01L 23/60 | 375/295 |
| 2015/0311913 A1* | 10/2015 | Pan | H03M 1/1245 | 341/156 |
| 2015/0318599 A1* | 11/2015 | Ivanov | H01P 1/268 | 375/296 |
| 2015/0333932 A1* | 11/2015 | Agrawal | H04L 25/028 | 375/295 |
| 2016/0248518 A1* | 8/2016 | Parikh | H04B 10/58 | |
| 2016/0254932 A1* | 9/2016 | Chong | H04L 25/03019 | 375/233 |

\* cited by examiner

METHOD AND SYSTEM USING DRIVER EQUALIZATION IN TRANSMISSION LINE CHANNELS WITH POWER OR GROUND TERMINATIONS

CROSS-REFERENCES TO RELATED APPLICATIONS

N/A

BACKGROUND OF THE INVENTION

The present invention relates to communication systems and integrated circuit (IC) devices. More particularly, the present invention provides a driver circuit device using driver equalization in transmission line channels with power or ground terminations.

Over the last few decades, the use of communication networks has exploded. In the early days of the Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

CMOS technology is commonly used to design communication systems implementing Optical Fiber Links. As CMOS technology is scaled down to make circuits and systems run at higher speed and occupy smaller chip (die) area, the operating supply voltage is reduced for lower power. Conventional FET transistors in deep-submicron CMOS processes have very low breakdown voltage as a result the operating supply voltage is maintained around 1 Volt. However, the Optical Modulators used in 100G-class optical links often require a bias voltage of more than 2 Volts across the anode and cathode nodes of the modulator for effective optical amplitude and/or phase modulation. These limitations provide significant challenges to the continued improvement of communication systems scaling and performance.

Accordingly, improvements to driver equalization in integrated circuit devices are highly desirable.

BRIEF SUMMARY OF THE INVENTION

The present invention relates to communication systems and integrated circuit (IC) devices. More particularly, the present invention provides a driver circuit device using driver equalization in transmission line channels with power or ground terminations.

In an embodiment, the present invention provides a driver circuit device using driver equalization in power and ground terminated transmission line channels. The driver circuit device can include a weaker pull-up driver, which is needed to pre-emphasize the pull-up signal for driver equalization in power terminated transmission line channels. The driver circuit device can also include a weaker pull-down driver, which is needed to pre-emphasize the pull-down signal for driver equalization in ground terminated transmission line channels. In the transmission line channels with power terminations, a weaker pull-up Ron is implemented. In the transmission line channels with ground terminations, a weaker pull-down Ron is implemented. Drivers implemented in power and/or ground terminated transmission line channels can be used to improve device performance, such as in signal eye opening.

Many benefits are recognized through various embodiments of the present invention. Such benefits include improvement of device performance by increasing signal eye opening. Other benefits will be recognized by those of ordinary skill in the art that the mechanisms described can be applied to other communications systems as well.

DETAILED DESCRIPTION OF THE INVENTION

The present invention relates to communication systems and integrated circuit (IC) devices. More particularly, the present invention provides a driver circuit device using driver equalization in transmission line channels with power or ground terminations.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1A:
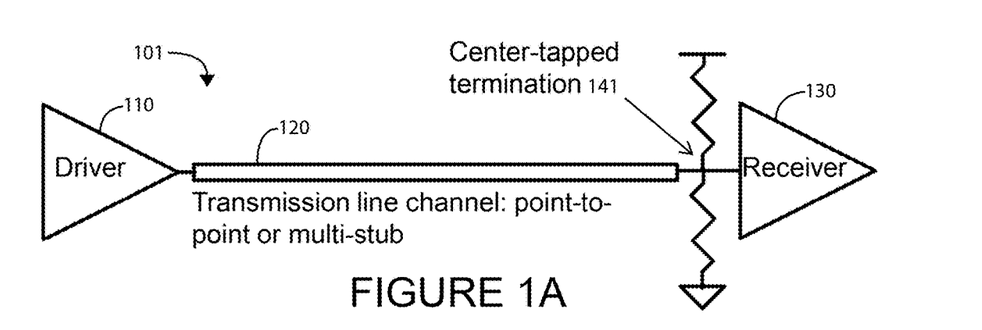
FIGS. 1A-1C are simplified circuit diagrams illustrating driver circuit devices according to various embodiments of the present invention.

FIG. 1A is a simplified circuit diagram illustrating a driver circuit device according to various embodiments of the present invention. As shown, driver circuit 101 includes at least a driver 110, a transmission line channel 120, and a receiver 130. The driver 110 can include a driver input and a driver output. The transmission line channel 120 can include a first end and a second end. This transmission line channel can be a configured as point-to-point or multi-stub. The receiver 130 can include a receiver input and a receiver output. The first end of the transmission line channel 120 can be electrically coupled to the driver output. The second end of the transmission line channel 120 can be electrically coupled to the receiver input. This second end is also configured with a center-tapped termination 141 having both a power termination to VDD and a ground termination to GND.

Figure 1B:
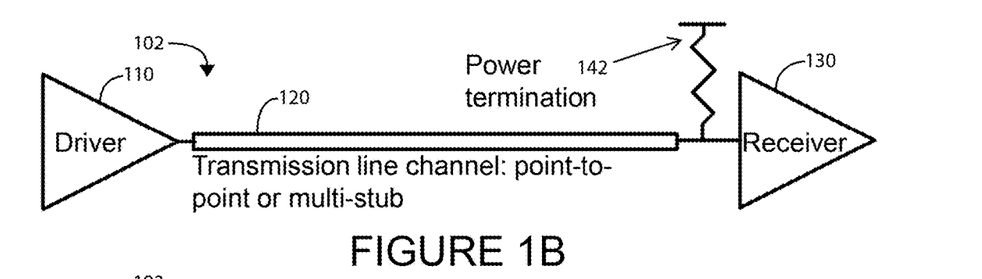

FIG. 1B is a simplified circuit diagram illustrating a driver circuit device according to various embodiments of the present invention. As shown, driver circuit 102 includes at least a driver 110, a transmission line channel 120, and a receiver 130. The driver 110 can include a driver input and a driver output. The transmission line channel 120 can include a first end and a second end. This transmission line channel can be a configured as point-to-point or multi-stub. The receiver can include a receiver input and a receiver output. The first end of the transmission line channel 120 can be electrically coupled to the driver output. The second end of the transmission line channel 120 can be electrically coupled to the receiver input. This second end is configured only with a power termination 142 to VDD.

Figure 1C:
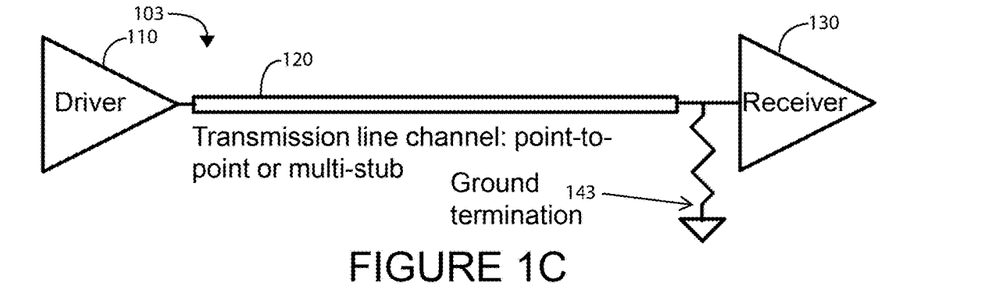

FIG. 1C is a simplified circuit diagram illustrating a driver circuit device according to various embodiments of the present invention. As shown, driver circuit 103 includes at least a driver 110, a transmission line channel 120, and a receiver 130. The driver 110 can include a driver input and a driver output. The transmission line channel 120 can include a first end and a second end. This transmission line channel can be a configured as point-to-point or multi-stub. The receiver can include a receiver input and a receiver output. The first end of the transmission line channel 120 can be electrically coupled to the driver output. The second end of the transmission line channel 120 can be electrically coupled to the receiver input. This second end is also configured only with a ground termination to GND.

Figure 2A:
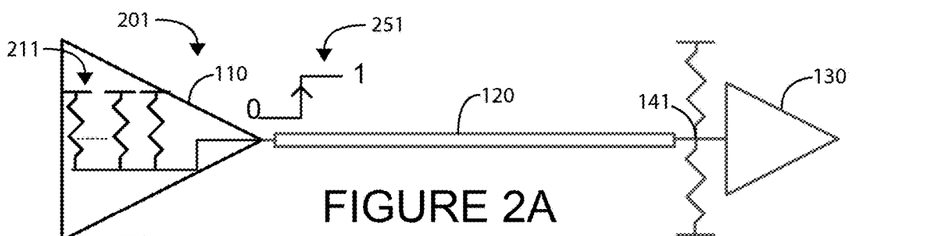
FIGS. 2A-2D are simplified circuit diagrams illustrating driver circuit devices according to conventional embodiments.

FIG. 2A is a simplified circuit diagram illustrating a driver circuit device according to a conventional embodiment. As shown, the driver circuit 201 can be similar to the driver circuit of FIG. 1A with a center-tapped termination. As an example, this driver circuit 201 represents a driver module for a signal pull up with "0" to "1" transition. The indicator 251 shows that this driver module is configured for the pull-up signal from "0" to "1". This pull-up driver is configured with a stronger Ron, resistance coefficient, as shown by the pull-up resistance network 211 within the driver 110. As an example, the resistance network can include a plurality of resistors connected in parallel between VDD and the driver output. Those of ordinary skill in the art will recognize other variations, modifications, and alternatives.

Figure 2B:
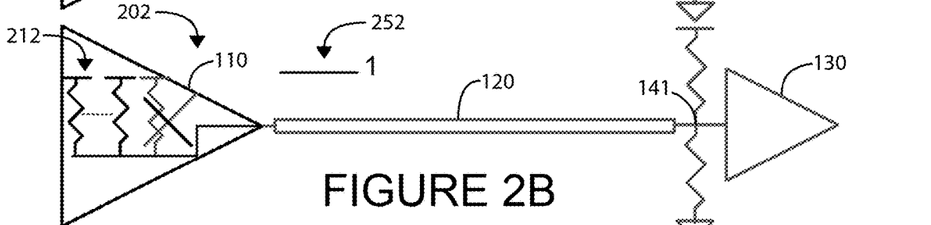

FIG. 2B is a simplified circuit diagram illustrating a driver circuit device according to a conventional embodiment. As shown, the driver circuit 202 can be a similar to the center-tapped terminated driver circuit of FIG. 1A. As an example, this driver circuit 202 represents a driver module for a signal pull-up with consecutive "1" s. The indicator 252 shows that this driver module is configured for the pull-up signal for consecutive "1" s. This pull-up driver is configured with a weaker Ron, resistance coefficient, as shown by the pull-up resistance network 212 within the driver 110. As an example, this resistance network can be a reduced network compared to the network 211 of FIG. 2A.

Figure 2C:
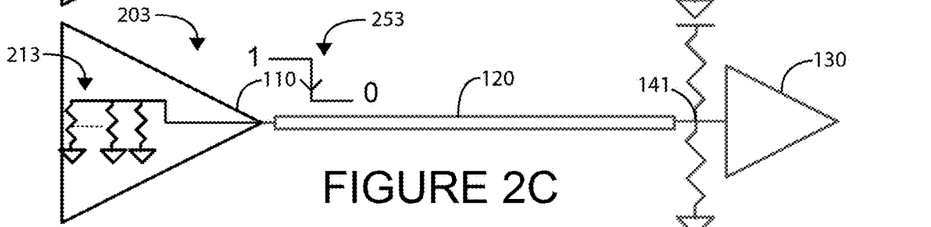

FIG. 2C is a simplified circuit diagram illustrating a driver circuit device according to a conventional embodiment. As shown, the driver circuit 203 can be a similar to the center-tapped terminated driver circuit of FIG. 1A. As an example, this driver circuit 203 represents a driver module for a signal pull-down. The indicator 253 shows that this driver module is configured for the pull-down signal from "1" to "0". Similar to the driver module of FIG. 2A, this pull-down driver is configured with a stronger Ron, resistance coefficient, as shown by the pull-up resistance network 213 within the driver 110. As an example, the resistance network can include a plurality of resistors connected in parallel between the driver output and GND.

Figure 2D:
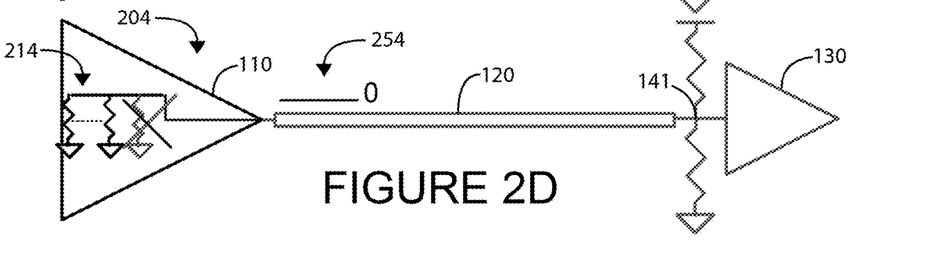

FIG. 2D is a simplified circuit diagram illustrating a driver circuit device according to a conventional embodiment. As shown, the driver circuit 204 can be a similar to the center-tapped terminated driver circuit of FIG. 1A. As an example, this driver circuit 204 represents a driver module for a signal pull-down with consecutive "0" s. The indicator 254 shows that this driver module is configured for the pull-down signal for consecutive "0" s. This pull-down driver is configured with a weaker Ron, resistance coefficient, as shown by the pull-up resistance network 214 within the driver 110. As an example, this resistance network can be a reduced network compared to the network 213 of FIG. 2C. These circuits are simplified representations each with a 1-tap pre-emphasis. Multiple taps with different coefficients can be implemented in a system or device as well.

Figure 3A:
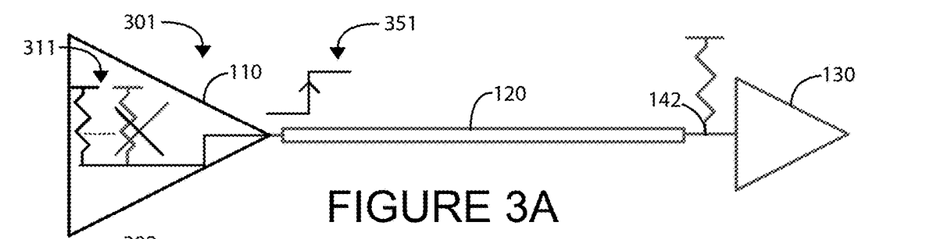
FIGS. 3A-3D are simplified circuit diagrams illustrating driver circuit devices according to various embodiments of the present invention.

FIG. 3A is a simplified circuit diagram illustrating a driver circuit device according to an embodiment of the present invention. As shown, the driver circuit 301 can be similar to the driver circuit of FIG. 1B with a power termination. As an example, this driver circuit 301 represents a driver module for a signal pull-up with "0" to "1" transition, denoted by indicator 351. Compared to the driver circuit of FIG. 2A, this pull-up driver is configured with a weaker Ron, resistance coefficient, as shown by the pull-up resistance network 311 within the driver 110. To have a stronger pull-up signal with VDD termination, a weaker pull-up Ron is needed (de-emphasis). Those of ordinary skill in the art will recognize other variations, modifications, and alternatives.

Figure 3B:
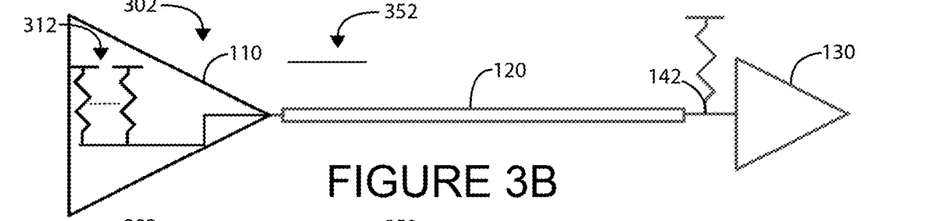

FIG. 3B is a simplified circuit diagram illustrating a driver circuit device according to an embodiment of the present invention. As shown, the driver circuit 302 can be similar to the driver circuit to the power terminated driver circuit of FIG. 1B. As an example, this driver circuit 302 represents a driver module for a signal pull-up with consecutive "1" s, denoted by indicator 352. Compared to the driver circuit of FIG. 2B, this pull-up driver is configured with a stronger Ron, resistance coefficient, as shown by the pull-up resistance network 312 within the driver 110. The configuration of the resistance networks 311 and 312 are the inverse of the configuration of the resistance networks 211 and 212 of FIGS. 2A and 2B, respectively.

Figure 3C:
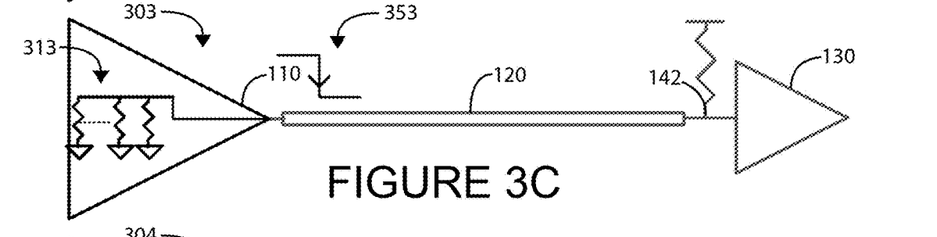

FIG. 3C is a simplified circuit diagram illustrating a driver circuit device according to an embodiment of the present invention. As shown, the driver circuit 303 can be similar to the driver circuit to the power terminated driver circuit of FIG. 1B. As an example, this driver circuit 303 represents a driver module for a signal pull-down from "1" to "0", denoted by indicator 353. Similar to FIG. 2C, this driver circuit is also configured with a stronger Ron, resistance coefficient, as shown by the pull-up resistance network 313 within the driver 110.

Figure 3D:
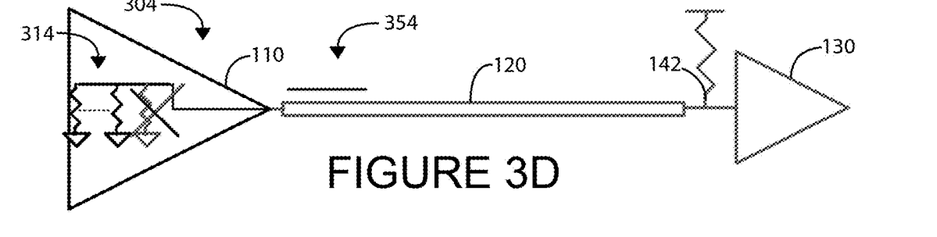

FIG. 3D is a simplified circuit diagram illustrating a driver circuit device according to an embodiment of the present invention. As shown, the driver circuit 304 can be similar to the driver circuit to the power terminated driver circuit of FIG. 1B. As an example, this driver circuit 304 represents a driver module for a signal pull-down for consecutive "0" s, denoted by indicator 354. Similar to FIG. 2D, this driver circuit is also configured with a weaker Ron, resistance coefficient, as shown by the pull-up resistance network 314 within the driver 110. The configuration of the resistance networks 313 and 314 are the same as the configuration of the resistance networks 213 and 214 of FIGS. 2C and 2D, respectively.

In an embodiment, the present invention provides a driver circuit device with power terminations using driver equalization. The driver can include a first driver module which includes a first driver having a first driver output, wherein the first driver is configured with a first resistance module, the first resistance module being characterized by a weak on-resistance, a first transmission line channel having a first end and a second end, the first end of the first transmission line channel being coupled to the first driver output, a first receiver having a first receiver input, the second end of the first transmission line channel being coupled to the first receiver input; and a first power termination coupled to the first receiver input and the second end of the first transmission line channel. The first driver module is configured for a pull-up signal from a "0" value to a "1" value, wherein the first driver is configured to pre-emphasize a pull-up signal for driver equalization. The weak on-resistance is characterized by a resistance value greater than or equal to 50Ω.

In a specific embodiment, the driver circuit device can include a second driver module including a second driver having a second driver output, wherein the second driver is configured with a second resistance module, the second resistance module being characterized by a strong on-resistance, a second transmission line channel having a first end and a second end, the first end of the second transmission line channel being coupled to the second driver output, a second receiver having a second receiver input, the second end of the second transmission line channel being coupled to the second receiver input; and a second power termination coupled to the second receiver input and the second end of the second transmission line channel. The second driver module is configured for a pull-up signal of consecutive "1" values. The strong on-resistance is characterized by a resistance value ranging between 0Ω to 50Ω.

In an example, pull-down Ron with VDD termination has no change from the configuration for the center-tapped termination. As described previously, the pull-up Ron with VDD termination is configured to be weaker in order to have a stronger pull-up signal. For a GND terminated configuration, a weaker pull-down Ron (de-emphasis) is needed to have a stronger pull-down signal.

In other words, a weaker pull-up driver is needed to pre-emphasize the pull-up signal for driver equalization in power terminated transmission line channels and a weaker pull-down driver is needed to pre-emphasize the pull-down signal for driver equalization in ground terminated transmission line channels. In the transmission line channels with power terminations, a weaker pull-up Ron is implemented. In the transmission line channels with ground terminations, a weaker pull-down Ron is implemented. Of course, there can be other variations, modifications, and alternatives.

In an embodiment, the present invention provides a driver circuit device with ground terminations using driver equalization. The driver circuit device can include a first driver module including a first driver having a first driver output, wherein the first driver is configured with a first resistance module, the first resistance module being characterized by a weak on-resistance, a first transmission line channel having a first end and a second end, the first end of the first transmission line channel being coupled to the first driver output, a first receiver having a first receiver input, the second end of the first transmission line channel being coupled to the first receiver input; and a first ground termination coupled to the first receiver input and the second end of the first transmission line channel. The first driver module is configured for a pull-down signal from a "1" value to a "0" value, wherein the first driver is configured to pre-emphasize a pull-down signal for driver equalization. The first driver module is configured for a pull-down signal from a "1" value to a "0" value. The weak on-resistance is characterized by a resistance value greater than or equal to 50Ω.

In a specific embodiment, the driver circuit device can include a second driver module including a second driver having a second driver output, wherein the second driver is configured with a second resistance module, the second resistance module being characterized by a strong on-resistance, a second transmission line channel having a first end and a second end, the first end of the second transmission line channel being coupled to the second driver output, a second receiver having a second receiver input, the second end of the second transmission line channel being coupled to the second receiver input; and a second ground termination coupled to the second receiver input and the second end of the second transmission line channel. The second driver module is configured for a pull-down signal of consecutive "0" values, wherein the first driver is configured to pre-emphasize a pull-down signal for driver equalization. The strong on-resistance is characterized by a resistance value ranging between 0Ω to 50Ω.

Figure 4:
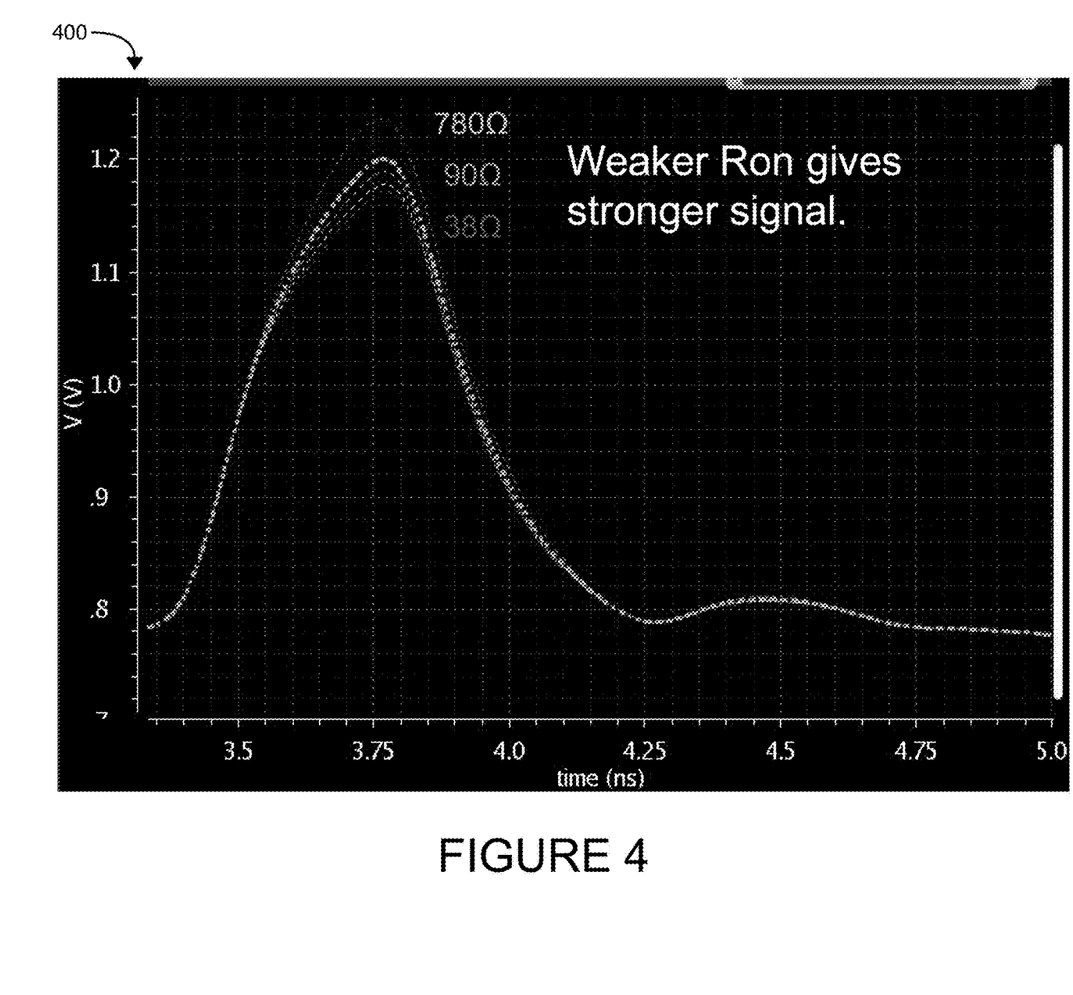
FIG. 4 is a simplified graph illustrating an impulse response at a receiver input of a driver circuit device according to an embodiment of the present invention.

FIG. 4 is a simplified graph illustrating an impulse response at a receiver input of a driver circuit device according to an embodiment of the present invention. This graph 400 shows multiple plots of impulse responses according to varying on-resistances (Ron) in the case of pull-up de-emphasis with VDD termination. As shown, signal impulse is stronger as Ron is weaker.

Figure 5A:
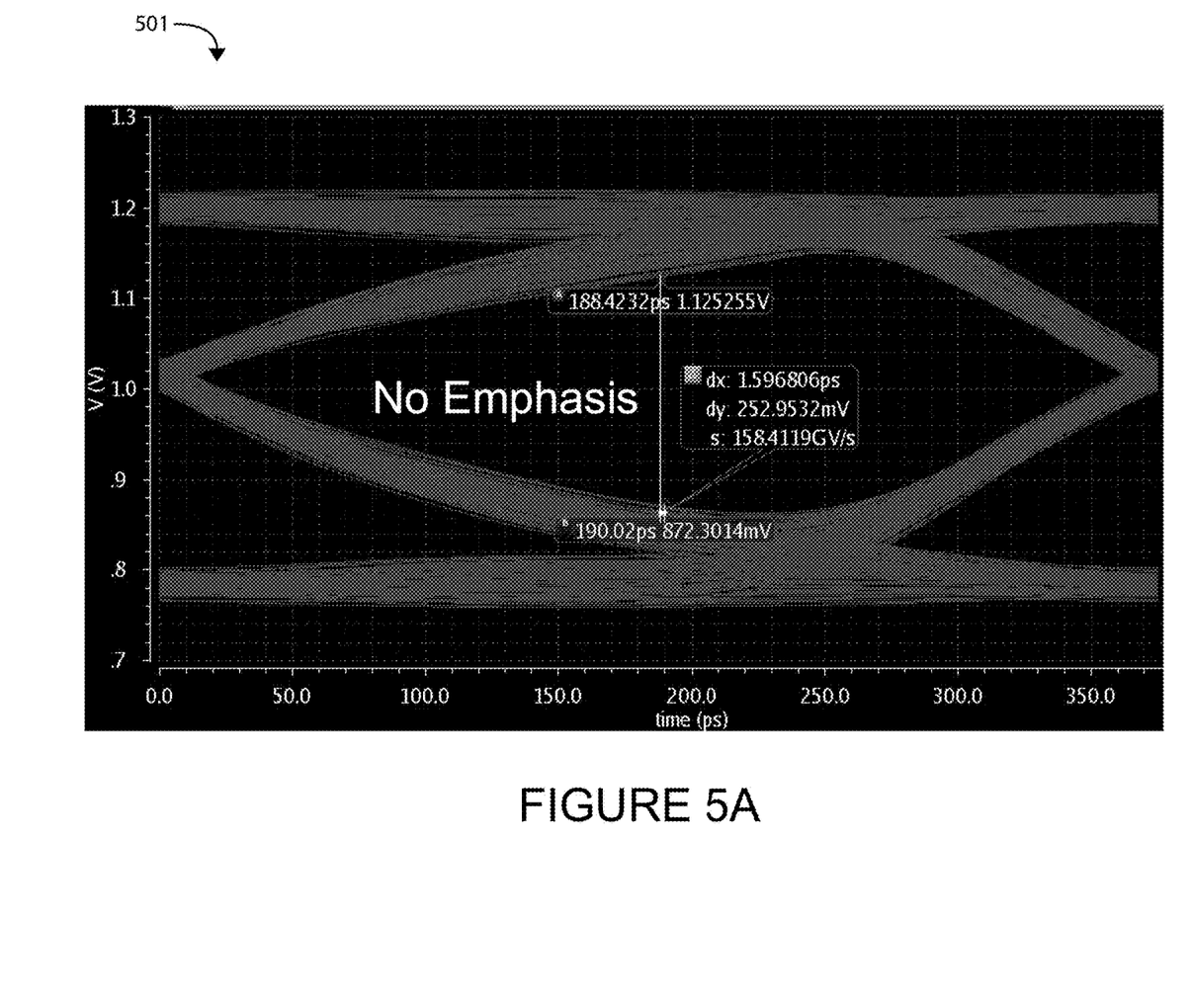
FIG. 5A is a simplified graph illustrating an eye diagram of a driver circuit device according to a conventional embodiment.

FIG. 5A is a simplified graph illustrating an eye diagram of a driver circuit device according to a conventional embodiment. This graph 501 shows an eye diagram at the receiver input of a driver circuit device without emphasis, such as with the conventional embodiment of FIGS. 2A through 2D.

Figure 5B:
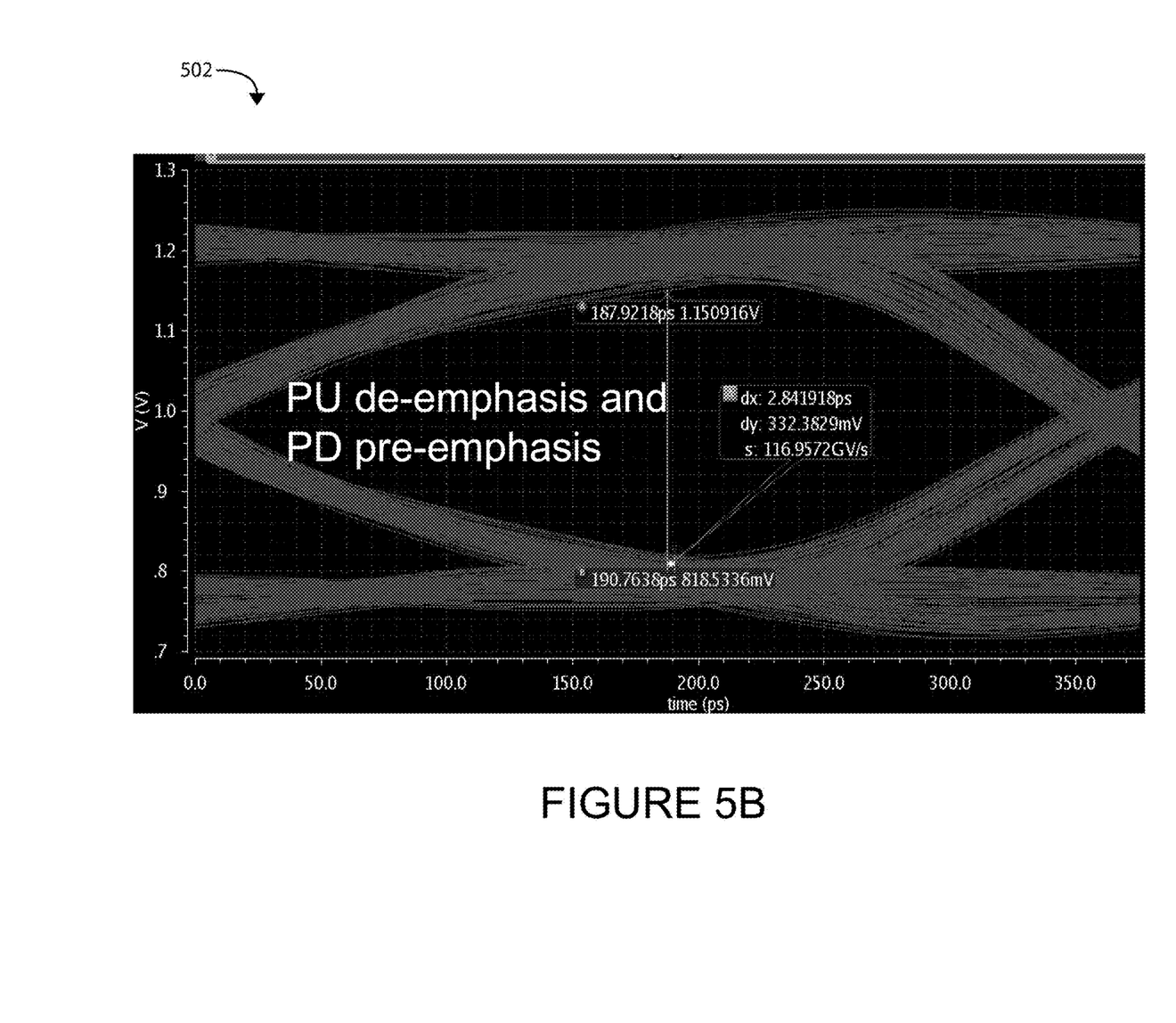
FIG. 5B is a simplified graph illustrating an eye diagram of a driver circuit device according to an embodiment of the present invention.

FIG. 5B is a simplified graph illustrating an eye diagram of a driver circuit device according to an embodiment of the present invention. This graph 502 shows an eye diagram at the receiver input of a driver circuit device with pull-up (PU) de-emphasis and pull-down (PD) pre-emphasis. An example of the pull-up de-emphasis was shown in FIGS. 3A and 3B. Compared to the graph of FIG. 5A, the pull-up de-emphasis and pull-down pre-emphasis produced an 80 mV center eye improvement.

Figure 6A:
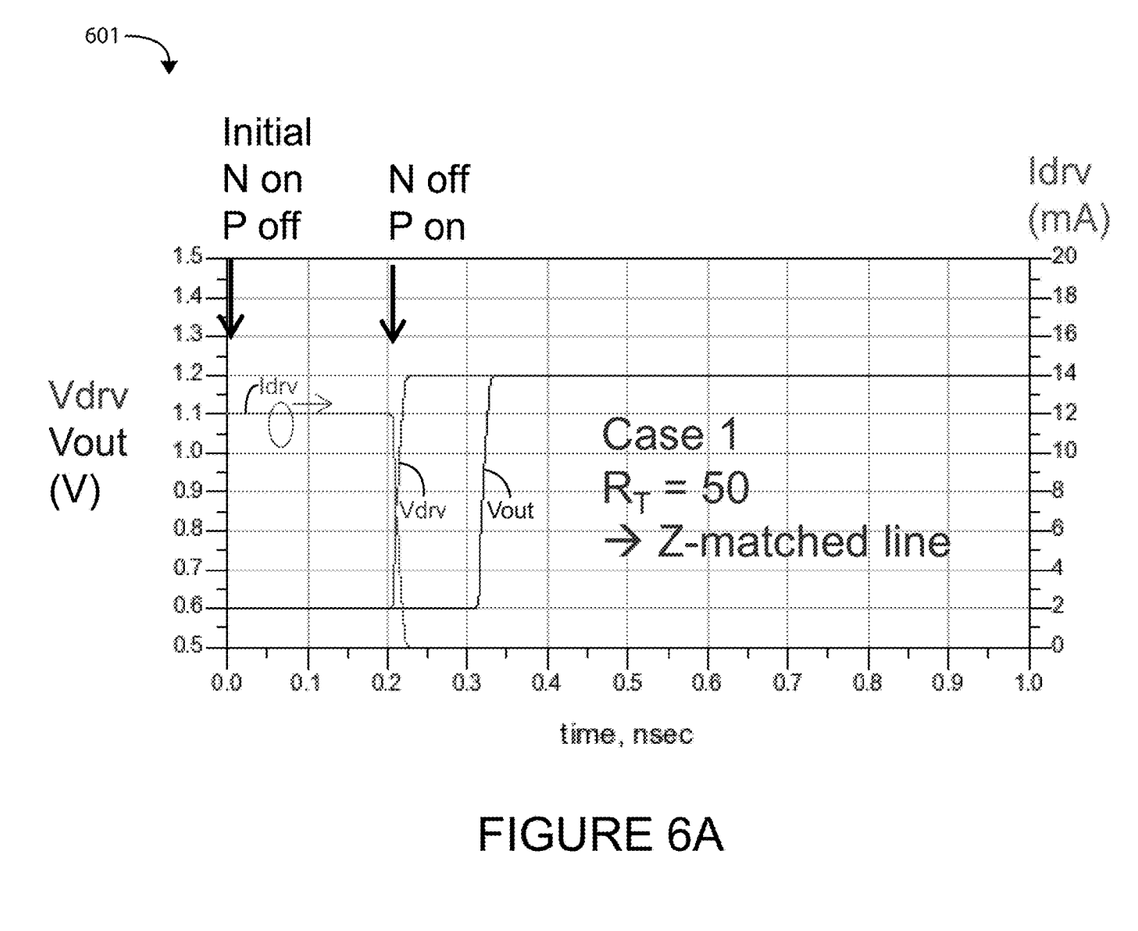
FIGS. 6A and 6B are simplified graphs illustrating a signal outputs for a driver circuit device according to various embodiments of the present invention.

FIG. 6A is a simplified graph illustrating a signal output for a driver circuit device according to an embodiment of the present invention. As shown, graph 601 shows drive current (Idrv), drive voltage (Vdrv), and output voltage (Vo) over time across a transmission line channel with an impedance (Zo) with an on- resistance value of 50 (Z-matched line). Considering an example driver with an NMOS and a PMOS, this graph begins with the NMOS turned on and the PMOS turned off. As the NMOS is turned off and the PMOS is turned on, Idrv drops to 0 and Vdrv snaps instantly to full VDD (1.2V in this case). Vo also snaps to full VDD after a delay. In an example, the NMOS turning off interrupts the steady state of current Idrv=VDD/(RT+RN) causing a reverse current wave I– into the transmission line with an associated voltage wave V–=Zo*I–(V is positive due to –z propagation). Max V+=Zo*Idrv.

Figure 6B:
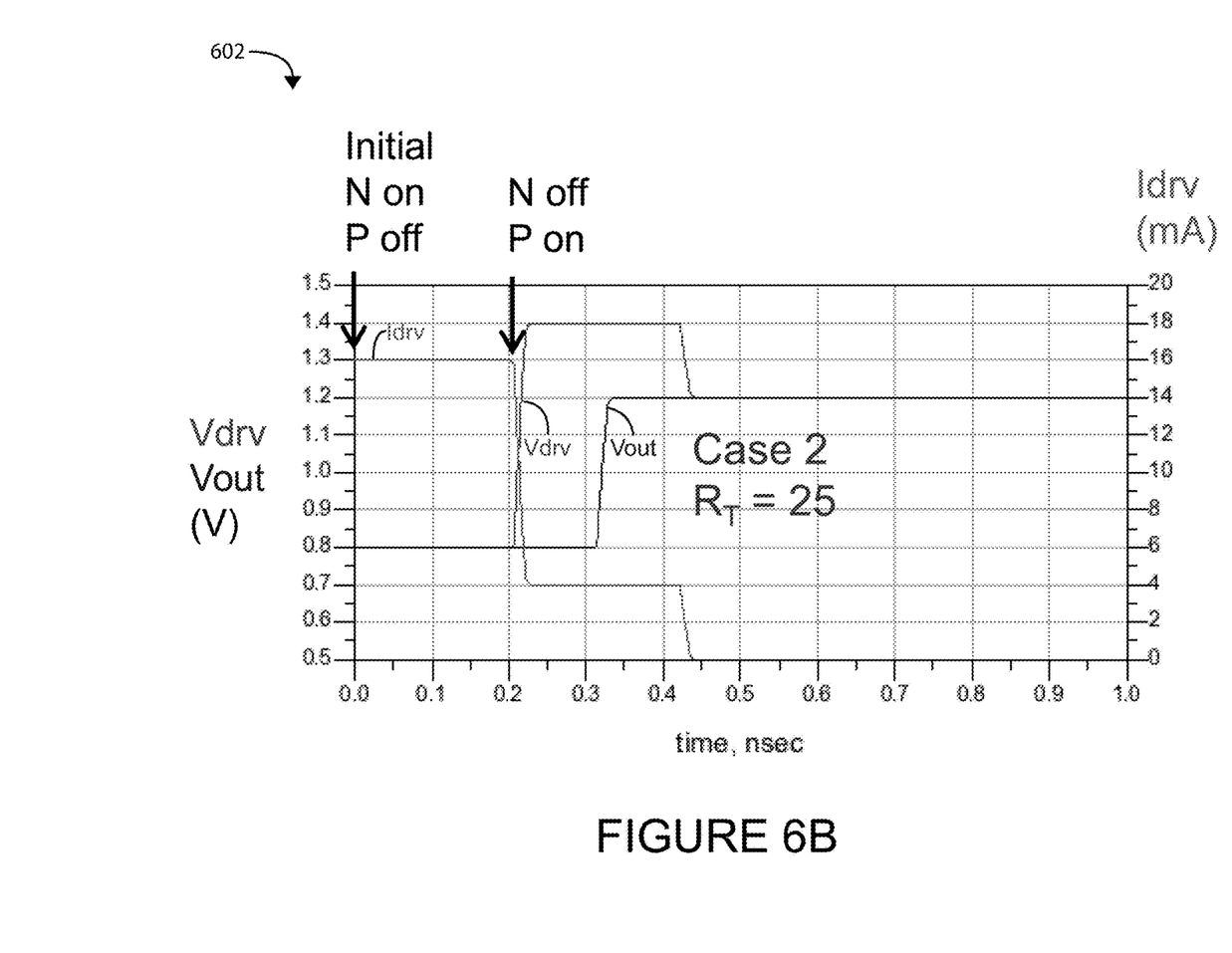

FIG. 6B is a simplified graph illustrating a signal output for a driver circuit device according to an embodiment of the present invention. As shown, graph 602 shows drive voltage and output voltage over time with an on-resistance value of 25. Considering again an example driver with an NMOS and a PMOS, this graph begins with the NMOS turned on and the PMOS turned off. As the NMOS is turned off and the PMOS is turned on, Idrv drops to 4 mA and Vdrv snaps instantly to 1.4. Vo snaps to full VDD after a delay similar to the case in graph 601. Idrv drops to 0 after another delay, and Vout drops to Vdd. In an example, this effect is maximized with high-Z PMOS. A "strong" PMOS fights this pulse by bleeding Idrv, which actually creates a weaker drive (4 mA@250 ps). The energized transmission lines are the actual pull-up device, rather than the PMOS transistor itself. The same theory can be applied to pull down signals with GND terminations.

Figure 7:
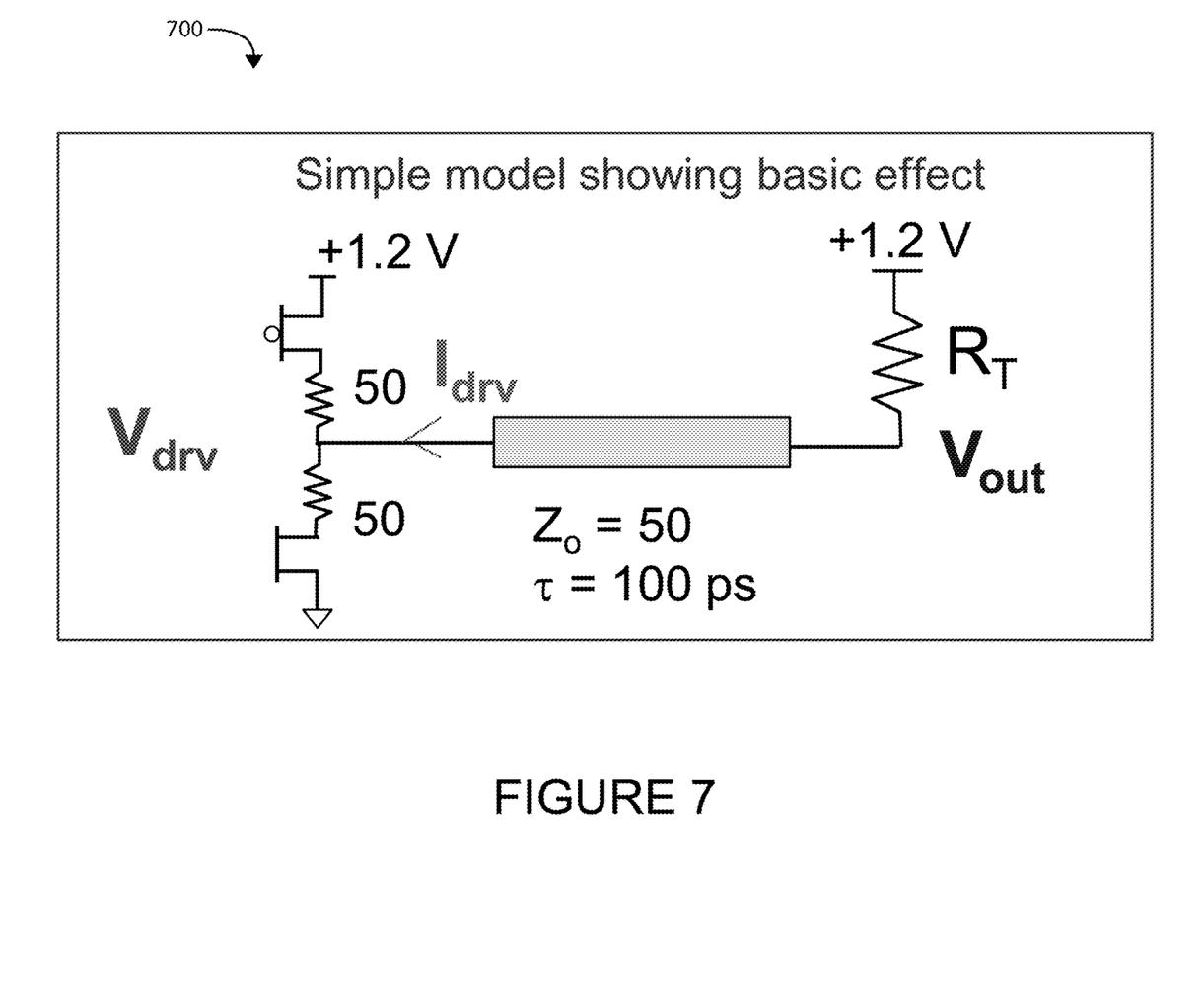
FIG. 7 is a simplified circuit diagram illustrating a driver circuit device according to an embodiment of the present invention.

FIG. 7 is a simplified circuit diagram illustrating a driver circuit device according to an embodiment of the present invention. As shown, the circuit diagram 700 includes driver with a PMOS 710 and an NMOS 720 coupled to a transmission line channel (Zo). This diagram is related to the graphs shown in FIGS. 6A and 6B. Vdrv is shown at the input to the driver on the left, which is also electrically coupled to the transmission line channel 730. Vout at the other end of the channel 730 is terminated to VDD (1.2V). Idrv is shown bleeding towards the driver, which contributes to the weaker drive described previously.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A driver circuit device comprising:
   a first power-terminated driver module including:
   a first driver having a first driver output, wherein the first driver is configured with a first resistance network module, the first resistance network module being characterized by a weak on-resistance, wherein the weak on-resistance is characterized by a resistance value greater than or equal to 50Ω;
   a first transmission line channel having a first end and a second end, the first end of the first transmission line channel being coupled to the first driver output;
   a first receiver having a first receiver input, the second end of the first transmission line channel being coupled to the first receiver input; and
   a first power termination coupled to the first receiver input and the second end of the first transmission line channel;
   wherein the first driver is configured using the first resistance network module to pre-emphasize a pull-up signal to strengthen the pull-up signal for driver equalization.

2. The device of claim 1 wherein the first driver module is configured for a pull-up signal from a "0" value to a "1" value.

3. The device of claim 1 further comprising:
   a second driver module including:
   a second driver having a second driver output, wherein the second driver is configured with a second resistance module, the second resistance network module being characterized by a strong on-resistance;
   a second transmission line channel having a first end and a second end, the first end of the second transmission line channel being coupled to the second driver output;
   a second receiver having a second receiver input, the second end of the second transmission line channel being coupled to the second receiver input; and
   a second power termination coupled to the second receiver input and the second end of the second transmission line channel.

4. The device of claim 3 wherein the second driver module is configured for a pull-up signal of consecutive "1" values.

5. The device of claim 3 wherein the strong on-resistance is characterized by a resistance value ranging between 0Ω to 50Ω.

6. A driver circuit device comprising:
   a first ground-terminated driver module including:
   a first driver having a first driver output, wherein the first driver is configured with a first resistance module, the first resistance network module being characterized by a weak on-resistance, wherein the weak on-resistance is characterized by a resistance value greater than or equal to 50Ω;
   a first transmission line channel having a first end and a second end, the first end of the first transmission line channel being coupled to the first driver output;
   a first receiver having a first receiver input, the second end of the first transmission line channel being coupled to the first receiver input; and
   a first ground termination coupled to the first receiver input and the second end of the first transmission line channel;
   wherein the first driver is configured using the first resistance network module to pre-emphasize a pull-down signal to strengthen the pull-down signal for driver equalization.

7. The device of claim 6 wherein the first driver module is configured for a pull-down signal from a "1" value to a "0" value.

8. The device of claim 6 further comprising:
a second driver module including:
- a second driver having a second driver output, wherein the second driver is configured with a second resistance module, the second resistance module being characterized by a strong on-resistance;
- a second transmission line channel having a first end and a second end, the first end of the second transmission line channel being coupled to the second driver output;
- a second receiver having a second receiver input, the second end of the second transmission line channel being coupled to the second receiver input; and
- a second ground termination coupled to the second receiver input and the second end of the second transmission line channel.

9. The device of claim 8 wherein the second driver module is configured for a pull-down signal of consecutive "0" values.

10. The device of claim 8 wherein the strong on-resistance is characterized by a resistance value ranging between 0Ω to 50Ω.

11. A driver circuit device comprising:
a first power-terminated pull-up driver module including:
- a first pull-up driver having a first pull-up driver output, wherein the first pull-up driver is configured with a first pull-up resistance module, the first pull-up resistance module being characterized by a weak pull-up on-resistance;
- a first pull-up transmission line channel having a first end and a second end, the first end of the first pull-up transmission line channel being coupled to the first pull-up driver output;
- a first pull-up receiver having a first pull-up receiver input, the second end of the first pull-up transmission line channel being coupled to the first pull-up receiver input; and
- a first pull-up power termination coupled to the first pull-up receiver input and the second end of the first pull-up transmission line channel;

wherein the first pull-up driver is configured using the first pull-up resistance module to de-emphasize a pull-down signal for driver equalization;
a second power-terminated pull-up driver module including:
- a second pull-up driver having a second pull-up driver output, wherein the second pull-up driver is configured with a second pull-up resistance module, the second pull-up resistance module being characterized by a strong pull-up on-resistance;
- a second pull-up transmission line channel having a first end and a second end, the first end of the second pull-up transmission line channel being coupled to the second pull-up driver output;
- a second pull-up receiver having a second pull-up receiver input, the second end of the second pull-up transmission line channel being coupled to the second pull-up receiver input; and
- a second pull-up power termination coupled to the second pull-up receiver input and the second end of the second pull-up transmission line channel;

a first ground-terminated pull-down driver module including:
- a first pull-down driver having a first pull-down driver output, wherein the first pull-down driver is configured with a first pull-down resistance module, the first pull-down resistance module being characterized by a strong pull-down on-resistance;
- a first pull-down transmission line channel having a first end and a second end, the first end of the first pull-down transmission line channel being coupled to the first pull-down driver output;
- a first pull-down receiver having a first pull-down receiver input, the second end of the first pull-down transmission line channel being coupled to the first pull-down receiver input; and
- a first pull-down power termination coupled to the first pull-down receiver input and the second end of the first pull-down transmission line channel;

wherein the first pull-down driver is configured using the first pull-down resistance module to pre-emphasize a pull-down signal for driver equalization; and
a second ground-terminated pull-down driver module including:
- a second pull-down driver having a second pull-down driver output, wherein the second pull-down driver is configured with a second pull-down resistance module, the second pull-down resistance module being characterized by a weak pull-down on-resistance;
- a second pull-down transmission line channel having a first end and a second end, the first end of the second pull-down transmission line channel being coupled to the second pull-down driver output;
- a second pull-down receiver having a second pull-down receiver input, the second end of the second pull-down transmission line channel being coupled to the second pull-down receiver input; and
- a second pull-down power termination coupled to the second pull-down receiver input and the second end of the second pull-down transmission line channel.

12. The device of claim 11 wherein the first pull-up driver module is configured for a pull-up signal from a "0" value to a "1" value; wherein the second pull-up driver module is configured for a pull-up signal for consecutive "1" values; wherein the first pull-down driver is configured for a pull-down signal from a "1" value to a "0" value; and wherein the second pull-down driver is configured for a pull-down signal for consecutive "0" values.

13. The device of claim 11 wherein the weak pull-up on-resistance is characterized by a resistance value greater than or equal to 50Ω, and the strong pull up on-resistance is characterized by a resistance value ranging between 0Ω to 50Ω.

14. The device of claim 11 wherein the weak pull-down on-resistance is characterized by a resistance value greater than 50Ω, and the strong pull down on-resistance is characterized by a resistance value ranging between 0Ω to 50Ω.

* * * * *